US012448250B2

(12) United States Patent
Yuasa et al.

(10) Patent No.: US 12,448,250 B2
(45) Date of Patent: Oct. 21, 2025

(54) ELEVATOR RENEWAL METHOD

(71) Applicant: Mitsubishi Electric Corporation, Tokyo (JP)

(72) Inventors: Hideaki Yuasa, Tokyo (JP); Kazuya Izuta, Tokyo (JP)

(73) Assignee: MITSUBISHI ELECTRIC CORPORATION, Tokyo (JP)

( * ) Notice: Subject to any disclaimer, the term of this patent is extended or adjusted under 35 U.S.C. 154(b) by 1071 days.

(21) Appl. No.: 17/439,809

(22) PCT Filed: Apr. 26, 2019

(86) PCT No.: PCT/JP2019/017909
§ 371 (c)(1),
(2) Date: Sep. 16, 2021

(87) PCT Pub. No.: WO2020/217449
PCT Pub. Date: Oct. 29, 2020

(65) Prior Publication Data
US 2022/0177277 A1 Jun. 9, 2022

(51) Int. Cl.
*B66B 19/00* (2006.01)

(52) U.S. Cl.
CPC .......... *B66B 19/007* (2013.01); *B66B 19/005* (2013.01)

(58) Field of Classification Search
CPC ...... B66B 19/007; B66B 19/005; B66B 19/04
See application file for complete search history.

(56) References Cited

U.S. PATENT DOCUMENTS 4,266,632 A * 5/1981 Yoneda .................... B66B 1/18 187/382
4,844,204 A * 7/1989 Ovaska .................... B66B 1/18 187/247

(Continued)

FOREIGN PATENT DOCUMENTS

DE 112017007872 T5 4/2020
JP 8-91728 A 4/1996

(Continued)

OTHER PUBLICATIONS

Indian Office Action issued Apr. 22, 2022, in Indian Application No. 202147047564.

(Continued)

*Primary Examiner* — Lawrence Averick
(74) *Attorney, Agent, or Firm* — XSENSUS LLP

(57) ABSTRACT

In an elevator renewal construction method, a series of divided construction work steps includes a first divided construction work step including the steps of: installing a communication-enabled hall device at each hall; installing a communication-enabled car device in a car; and installing a communication relay device and connecting the communication relay device and an old control panel to each other; connecting the communication relay device and each of the communication-enabled hall devices to each other and connecting the communication relay device and the communication-enabled car device to each other. After termination of the first divided construction work step, the old control panel is in a state of being communicable with the communication-enabled hall devices and the communication-enabled car device via the communication relay device.

17 Claims, 5 Drawing Sheets

(56) References Cited

U.S. PATENT DOCUMENTS

| | | | | |
|---|---|---|---|---|
| 5,352,857 | A * | 10/1994 | Ovaska | G05B 19/07 187/247 |
| 2008/0149432 | A1 | 6/2008 | Friedli et al. | |
| 2012/0023722 | A1 | 2/2012 | Endo | |
| 2018/0229967 | A1* | 8/2018 | Fauconnet | B66B 1/12 |
| 2020/0095096 | A1 | 3/2020 | Okuda et al. | |

FOREIGN PATENT DOCUMENTS

| | | | |
|---|---|---|---|
| JP | 10-59663 | A | 3/1998 |
| JP | 2003-81556 | A | 3/2003 |
| JP | 2008-156117 | A | 7/2008 |
| JP | 2013-124147 | A | 6/2013 |
| WO | 2011/001495 | A1 | 1/2011 |
| WO | 2018/109946 | A1 | 6/2018 |

OTHER PUBLICATIONS

Office Action issued on May 17, 2022, in corresponding Japanese patent Application No. 2021-515683, 8 pages.

International Search Report and Written Opinion mailed on Jun. 18, 2019, received for PCT Application PCT/JP2019/017909, Filed on Apr. 26, 2019, 8 pages including English Translation.

Office Action issued on Aug. 1, 2025, in corresponding German patent Application No. 112019007264.1, 9 pages.

* cited by examiner

| DIVIDED CONSTRUCTION WORK STEPS | WORK NAMES | DETAILS OF WORK |
|---|---|---|
| STEP S1 | PRELIMINARY WORK | ･INSTALL NEW CONTROL PANEL<br>･INSTALL COMMUNICATION-ENABLED HALL DEVICES<br>･INSTALL COMMUNICATION-ENABLED CAR DEVICE<br>･INSTALL COMMUNICATION RELAY DEVICE |
| STEP S2 | WORK ON CAR | ･INSTALL NEW CAR DEVICE |
| STEP S3 | WORK ON HALLS | ･INSTALL NEW HALL DEVICES |
| STEP S4 | CONTROL MODERNIZATION WORK | ･INSTALL NEW CAR CONTROLLER |
| STEP S5 | TRACTION MACHINE REPLACEMENT WORK | ･INSTALL NEW TRACTION MACHINE |

FIG.2

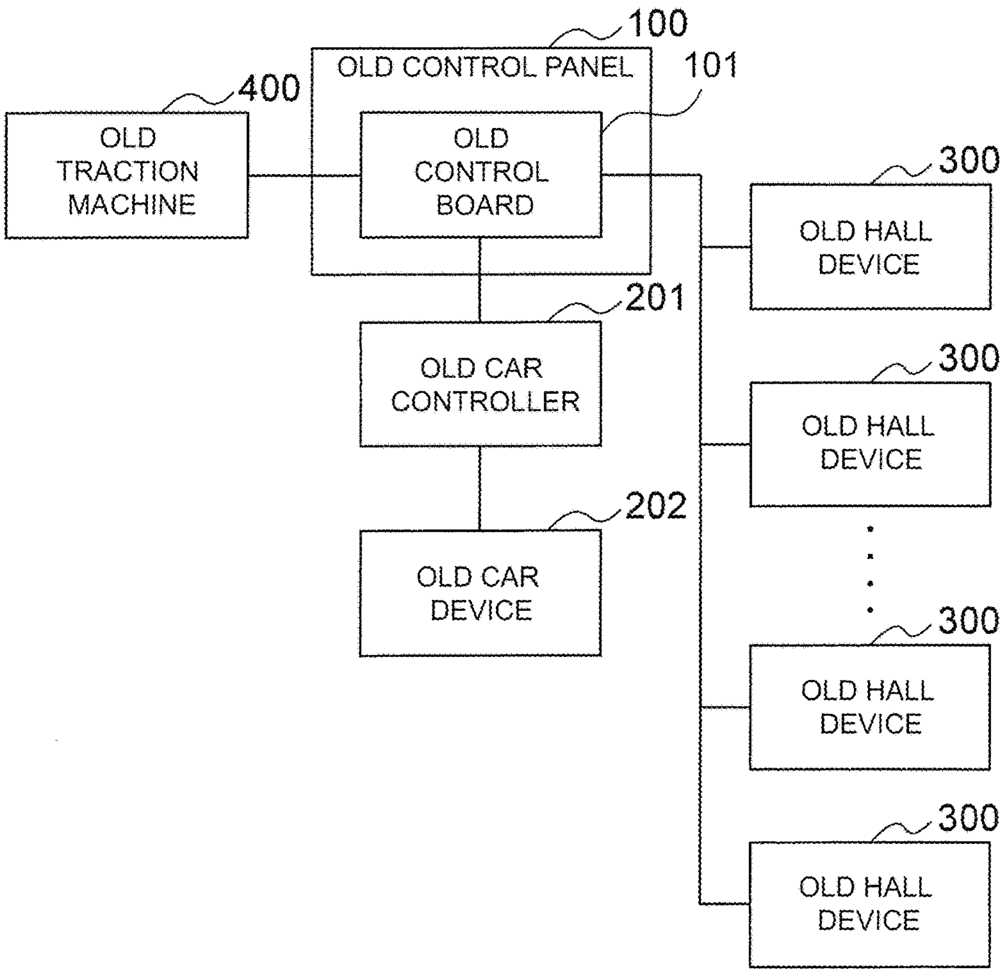

FIG.3

ELEVATOR RENEWAL METHOD

CROSS-REFERENCE TO RELATED APPLICATION

The present application is based on PCT filing PCT/JP2019/017909, filed Apr. 26, 2019, the entire contents of which are incorporated herein by reference.

TECHNICAL FIELD

The present invention relates to an elevator renewal construction method.

BACKGROUND ART

In order to cope with aging degradation of a device or to improve performance such as energy saving performance, elevator renewal is performed with respect to an existing elevator. In this case, during an elevator renewal construction work period in which at least one device in the existing elevator is to be renovated, an operation of the elevator is required to be continuously suspended for a long period of time. Thus, a long elevator out-of-service period has been a major obstacle to the renewal.

To address this problem, there is proposed an elevator renewal construction method for shortening a continuous elevator out-of-service period during the elevator renewal construction work period (see, for example, Patent Literature 1).

CITATION LIST

Patent Literature

[PTL 1] WO 2018/109946 A1

SUMMARY OF INVENTION

Technical Problem

A new method for shortening the continuous elevator out-of-service period during the elevator renewal construction work period, which is an approach different from the method disclosed in Patent Literature 1 described above, may be needed depending on specifications of the elevator.

The present invention has been made to solve the problems described above, and has an object to provide an elevator renewal construction method, which enables shortening of a continuous elevator out-of-service period during an elevator renewal construction work period through an approach different from those in the related art.

Solution to Problem

According to the present invention, there is provided an elevator renewal construction method, including: dividing, at a time of renewal of at least one device in an elevator, a process of the renewal into a series of divided construction work steps each determined as such a unit that the elevator is brought into a normally operable state after termination of each of the divided construction work steps; and executing the renewal in accordance with the series of divided construction work steps, wherein the series of the divided construction work steps includes a first divided construction work step, the first divided construction work step including the steps of: installing a communication-enabled hall device at each hall; installing a communication-enabled car device in a car; and installing a communication relay device and connecting the communication relay device and an old control panel to each other; connecting the communication relay device and each of the communication-enabled hall devices to each other and connecting the communication relay device and the communication-enabled car device to each other, and wherein, after termination of the first divided construction work step, the old control panel is in a state of being communicable with the communication-enabled hall devices and the communication-enabled car device via the communication relay device.

Advantageous Effects of Invention

According to the present invention, it is possible to provide the elevator renewal construction method, which enables shortening of the continuous elevator out-of-service period during the elevator renewal construction work period through the approach different from those in the related art.

BRIEF DESCRIPTION OF DRAWINGS

FIG. 2 is a table for showing an example of a series of divided construction work steps of the elevator renewal construction method according to the first embodiment of the present invention.

FIG. 3 is a block diagram for illustrating an initial state of the elevator device to which the elevator renewal construction method according to the first embodiment of the present invention is to be applied.

DESCRIPTION OF EMBODIMENT

A description is now given of an elevator renewal construction method according to a preferred embodiment of the present invention with reference to the accompanying drawings, and throughout the drawings, like or corresponding components are denoted by like reference symbols to describe those components. The term "communication" used in the embodiment includes transmission and reception of various kinds of signals such as a control signal, a voltage signal, and a current signal.

First Embodiment

Figure 1:
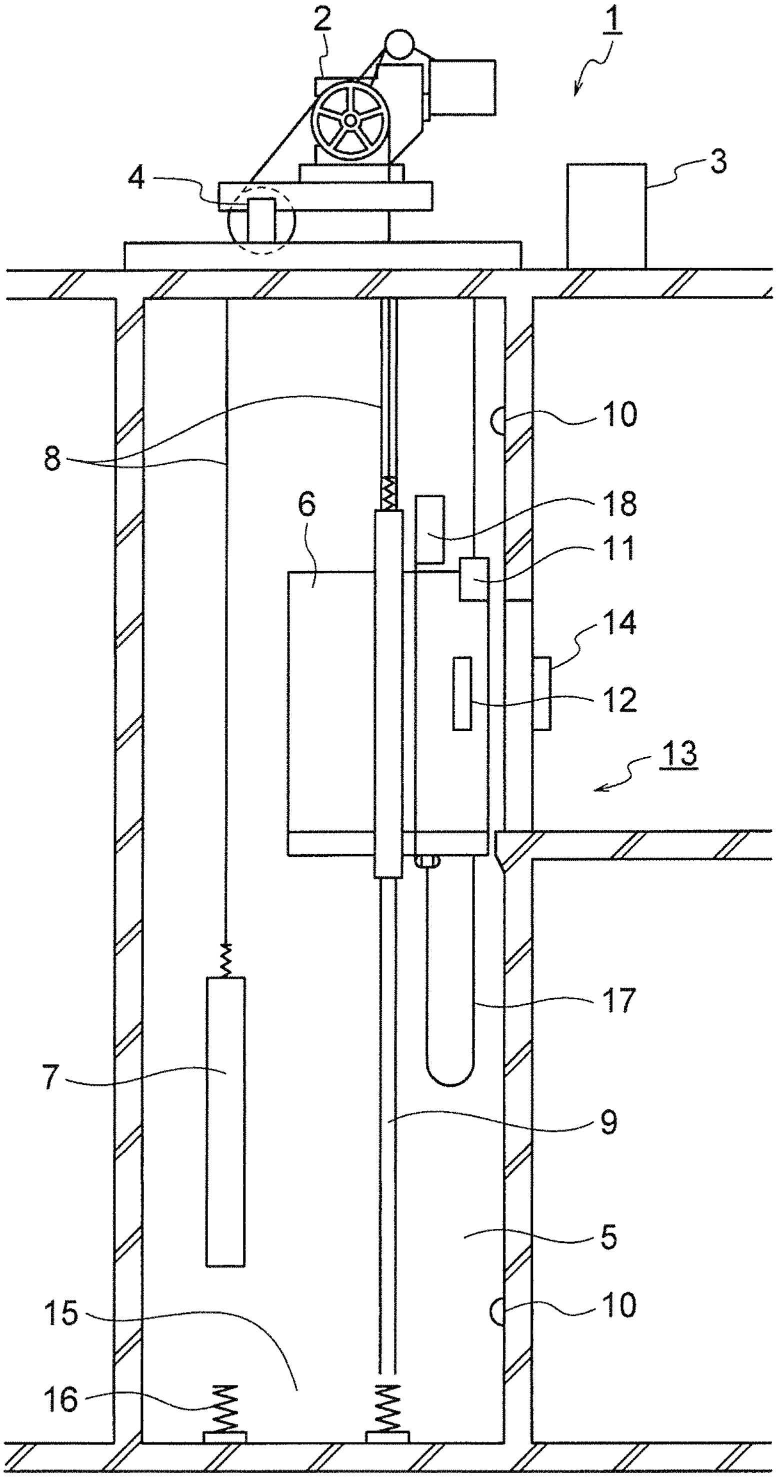
FIG. 1 is a configuration view for illustrating an elevator device to which an elevator renewal construction method according to a first embodiment of the present invention is to be applied.

FIG. 1 is a configuration view for illustrating an elevator device to which an elevator renewal construction method according to a first embodiment of the present invention is to be applied. As illustrated in FIG. 1, in a machine room 1, there are provided a traction machine 2 including a traction motor, a control panel 3, and a speed governor 4. The control panel 3 is configured to control the elevator. In a hoistway 5, there are provided a car 6, a counterweight 7, a main rope 8, guide rails 9, and a terminal slowdown switch 10. The main rope 8 is configured to couple the car 6 and the counterweight 7 to each other.

A door driving device 11 is provided to the car 6. The door driving device 11 includes a door motor, an encoder, and a full-closing detector. The door motor is configured to drive a car door provided to the car 6. The encoder is configured to detect a rotational position of the door motor. The full-closing detector is configured to detect full closing of the car door. Further, a car operating panel 12 is provided in the car 6. A hall operating panel 14 is provided at a hall 13. Buffers 16 are provided in a pit 15.

A device related to the car 6 is referred to as "car device". As specific examples of the car device, there are given the door driving device 11 and the car operating panel 12. Further, a device related to the hall 13 is referred to as "hall device". As specific examples of the hall device, there are given the hall operating panel 14, an indicator, and a hall lantern. Further, a device related to the hoistway 5 is referred to as "hoistway device". As specific examples of the hoistway device, there are given the terminal slowdown switch 10 and a hoistway cable (not shown).

A car controller 18 is provided to the car 6. More specifically, the car controller 18 is provided, for example, on top of the car 6. The car controller 18 is connected to the control panel 3 through a traveling cable 17. The car controller 18 is connected to the car device through a cable (not shown). The car controller 18 controls the car device in accordance with an instruction received from the control panel 3. Specifically, the car controller 18 opens and closes the car door by controlling the door driving device 11 in accordance with the instruction received from the control panel 3. Further, the car controller 18 feeds a signal received from the car device to the control panel 3.

Next, divided construction work steps to be carried out during an elevator renewal construction work period are described with reference to FIG. 2. FIG. 2 is a table for showing examples of a series of divided construction work steps of the elevator renewal construction method according to the first embodiment of the present invention.

In this case, renewal construction work is divided into a plurality of divided construction work steps so as to shorten a continuous elevator out-of-service period during an elevator renewal construction work period. Each of the divided construction work steps is designed to be completed within a continuous time period that can be ensured. After termination of each of the divided construction work steps, a user can use the elevator. Specifically, the shortening of the continuous elevator out-of-service period in the elevator renewal construction work period presupposes the availability of the elevator at the time of termination of each of the divided construction work steps. For example, in a condominium, the elevator is required to be available in morning and night hours in which a large number of users use the elevator for, for example, commuting to and from work and school. In a restaurant tenant building, the elevator is required to be available in, for example, evening and night business hours.

Thus, when at least one device in the elevator is to be renovated, a process of the renewal is divided into a series of divided construction work steps each determined as such a unit that the elevator is brought into a normally operable state every time after termination of each of the divided construction work steps. The renewal construction work is carried out in accordance with the series of the divided construction work steps. As shown in FIG. 2, the process of the renewal construction work is divided into, for example, five divided construction work steps S1 to S5. However, the divided construction work steps are required to be organized into groups depending on specifications of the elevator.

In a divided construction work step S1, a new control panel is installed separately from an old control panel, which is an existing control panel. The new control panel may be installed in a divided construction work step S4 described later. Subsequently, a communication-enabled hall device is installed at a hall of each of floors on which old hall devices being existing hall devices are installed, respectively. The communication-enabled hall device has functions as a hall device, and includes a communication module built therein, which is configured to enable wired communication or wireless communication with the old control panel.

Further, a communication-enabled car device is installed in the car. The communication-enabled car device has functions as a car device, and includes a communication module built therein, which is configured to enable wired communication or wireless communication with the old control panel. Further, a communication relay device is installed in the vicinity of the old control panel. The communication relay device includes a communication module built therein, which enables wired communication or wireless communication between the old control panel and each of the communication-enabled hall devices and the communication-enabled car device.

As an example of the above-mentioned wired communication, there is given power line communication (PLC). As examples of the wireless communication, there are given mobile communication such as 4G or 5G, satellite communication, Wi-Fi, Bluetooth (trademark), near-field optical communication, and visible light communication.

In the first embodiment, there is exemplified a mode in which the wireless communication is performed between the communication relay device and the communication-enabled hall devices and the wireless communication is performed between the communication relay device and the communication-enabled car device. After termination of the divided construction work step S1, the elevator is brought into a normally operable state.

In a divided construction work step S2, a new car device is installed in the car. The divided construction work step S2 is carried out after the divided construction work step S1. After termination of the divided construction work step S2, the elevator is brought into a normally operable state.

In a divided construction work step S3, new hall devices are installed at the halls of the floors on which the existing hall devices are installed, respectively. The divided construction work step S3 is carried out after the divided construction work step S2. After termination of the divided construction work step S3, the elevator is brought into a normally operable state.

In a divided construction work step S4, a new car controller is installed in the car. The divided construction work step S4 is carried out after the divided construction work step S3. After termination of the divided construction work step S4, the elevator is brought into a normally operable state.

In a divided construction work step S5, an existing old traction machine is replaced with a new traction machine. The divided construction work step S5 is carried out after the divided construction work step S4. After termination of the divided construction work step S5, the elevator is brought into a normally operable state.

As described above, after each one of the series of divided construction work steps is terminated, the elevator is brought into a normally operable state. Thus, after termination of one divided construction work step, the elevator becomes available for the user for a given time period. As a result, the continuous elevator out-of-service period can be shortened.

(Renovation Method)

Next, with reference to FIG. 3 to FIG. 9, the elevator renewal construction method according to the first embodiment is described. FIG. 3 is a block diagram for illustrating an initial state of the elevator device to which the elevator renewal construction method according to the first embodiment of the present invention is to be applied.

As illustrated in FIG. 3, an existing old control panel 100 includes an old control board 101, which is a control board configured to control the elevator device. When the elevator device is in the initial state, the old control board 101 is connected to an existing old car controller 201 before renewal in a wired manner. The old car controller 201 is connected to an existing old car device 202 in a wired manner. An existing old hall device 300 is provided on each floor of a building in which the elevator is installed. The old control board 101 is connected to the old hall devices 300 in a wired manner. Further, the old control board 101 is connected to an existing old traction machine 400 in a wired manner.

The old control board 101 communicates with the old car device 202 via the old car controller 201. Further, the old control board 101 communicates with each of the old hall devices 300 and the old traction machine 400. The old control board 101 controls the elevator device through the communications described above.

(Divided Work-Execution Step S1: Preliminary Work)

Figure 4:
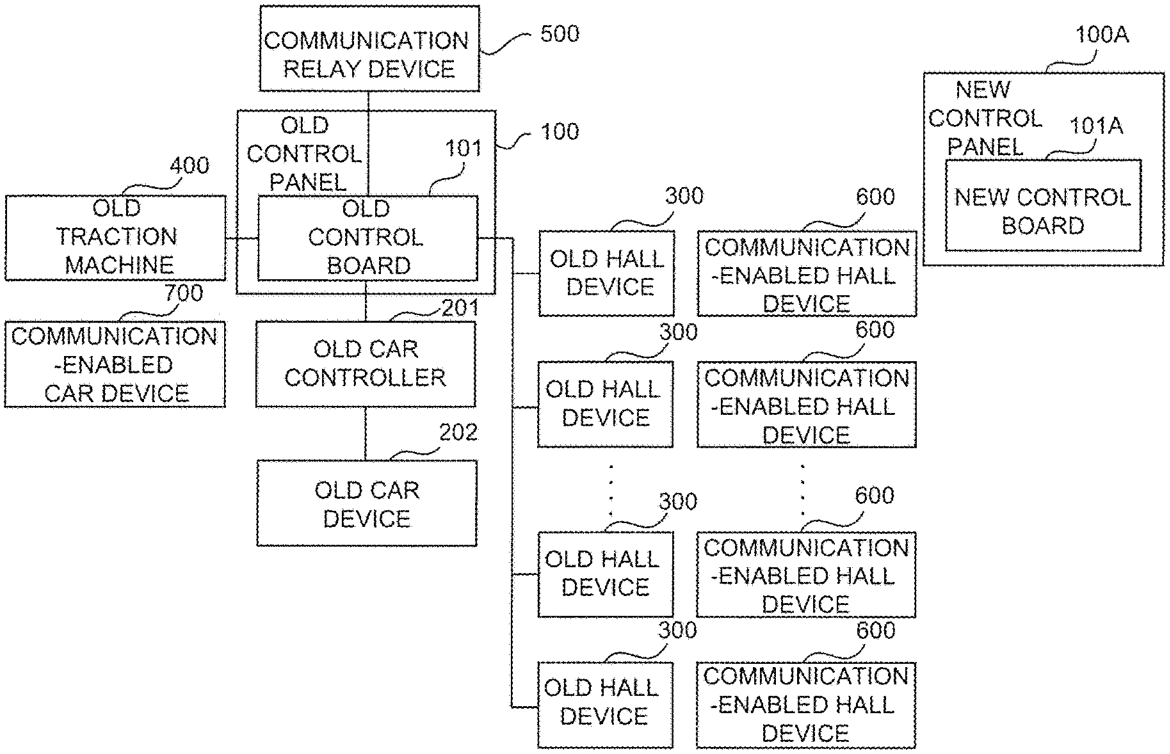
FIG. 4 is a block diagram for illustrating a state of the elevator device after a divided construction work step S1 is carried out for the elevator device in the initial state illustrated in FIG. 3.

Next, the divided construction work step S1 is described with reference to FIG. 4. FIG. 4 is a block diagram for illustrating a state of the elevator device after the divided construction work step S1 is carried out for the elevator device in the initial state illustrated in FIG. 3.

In the divided construction work step S1, there is carried out a step of installing a new control panel 100A in the machine room. The new control panel 100A includes a new control board 101A, which is a control board configured to control the elevator device.

There is carried out a step of installing a communication-enabled hall device 600 at the hall of each of the floors on which the old hall devices 300 are installed, respectively. At the hall of each of the floors, the old hall device 300 and the communication-enabled hall device 600 correspond to each other on a one-to-one basis.

Subsequently, there is carried out a step of installing a communication-enabled car device 700 in the car. Further, there is carried out a step of installing a communication relay device 500 in the vicinity of the old control panel 100 and connecting the communication relay device 500 and the old control board 101 to each other in a wired manner.

Subsequently, there is carried out a step of wirelessly connecting the communication relay device 500 and each of the communication-enabled hall devices 600 to each other. Further, there is carried out a step of wirelessly connecting the communication relay device 500 and the communication-enabled car device 700 to each other.

As described above, the first divided construction work step S1, which is one of the series of divided construction work steps, includes at least the following steps A1 to A5.

(Step A1) The step of installing the new control panel 100A.

(Step A2) The step of installing the communication-enabled hall device 600 at the hall of each of the floors.

(Step A3) The step of installing the communication-enabled car device 700 in the car.

(Step A4) The step of installing the communication relay device 500 and connecting the communication relay device 500 and the old control board 101 of the old control panel 100 to each other in a wired manner.

(Step A5) The step of wirelessly connecting the communication relay device 500 and each of the communication-enabled hall devices 600 to each other and wirelessly connecting the communication relay device 500 and the communication-enabled car device 700 to each other.

After execution of the above-mentioned steps, the old control board 101 of the old control panel 100 can communicate with the communication-enabled hall devices 600 via the communication relay device 500. Further, the old control board 101 can also communicate with the old hall devices 300.

After execution of the above-mentioned steps, the old control board 101 can communicate with the communication-enabled car device 700 via the communication relay device 500. Further, the old control board 101 can also communicate with the old car device 202 via the old car controller 201.

As described above, the divided construction work step S1 includes the steps of: installing the communication-enabled hall device 600 at each hall; installing the communication-enabled car device 700 in a car; and installing the communication relay device 500 and connecting the communication relay device 500 and the old control panel 100 to each other; connecting the communication relay device 500 and each of the communication-enabled hall devices 600 to each other; and connecting the communication relay device 500 and the communication-enabled car device 700 to each other. Further, after termination of the divided construction work step S1, the old control panel 100 is in a state of being communicable with the communication-enabled hall devices 600 and the communication-enabled car device 700 via the communication relay device 500.

Thus, after termination of the divided construction work step S1, the elevator can be controlled through the old control panel 100 under a state in which the old hall devices 300 and the communication-enabled hall devices 600 are present at the same time and the old car device 202 and the communication-enabled car device 700 are present at the same time. As a result, the elevator can be brought into a normally operable state. Specifically, the user can use the elevator by using the communication-enabled hall device 600 or the old hall device 300 at the hall of each of the floors and using the communication-enabled car device 700 or the old car device 202 in the car.

(Divided Work-Execution Step S2: Work on Car)

Figure 5:
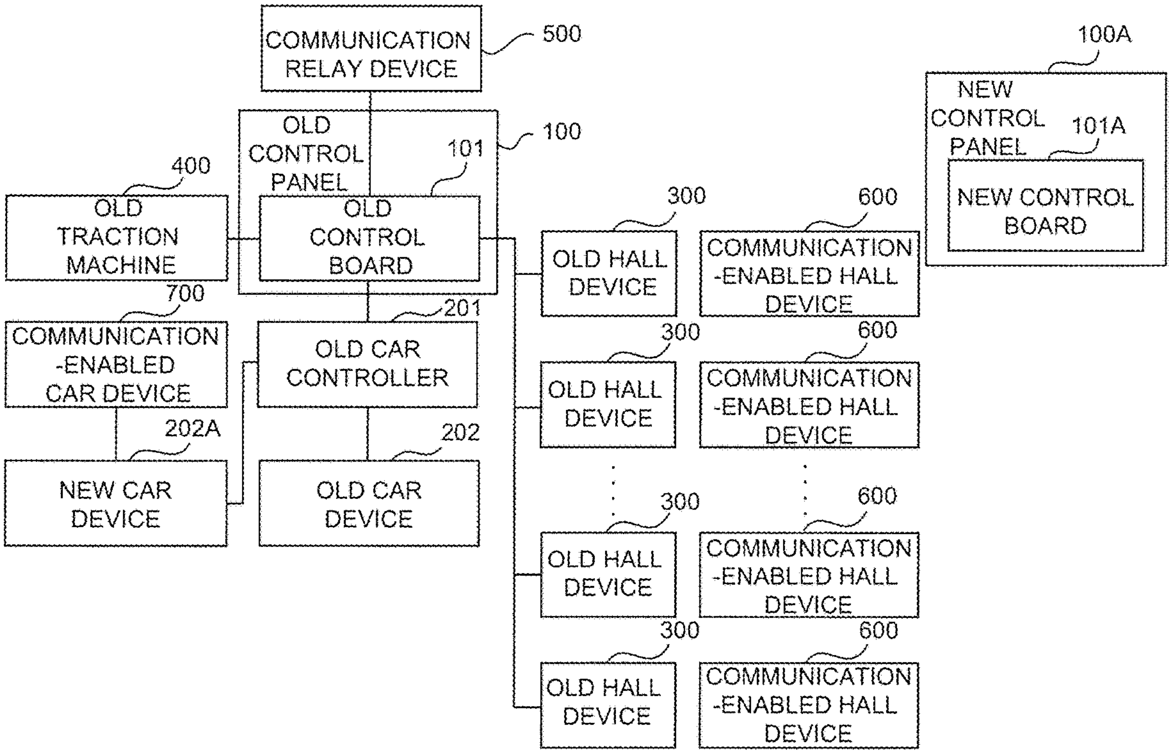
FIG. 5 is a block diagram for illustrating a state of the elevator device after a divided construction work step S2 is carried out for the elevator device in the state illustrated in FIG. 4.

Next, the divided construction work step S2 is described with reference to FIG. 5. FIG. 5 is a block diagram for illustrating a state of the elevator device after the divided construction work step S2 is carried out for the elevator device in the state illustrated in FIG. 4.

In the divided construction work step S2, there is carried out a step of installing a new car device 202A in the car. Subsequently, there is carried out a step of connecting the new car device 202A and the communication-enabled car device 700 to each other in a wired manner. Further, there is carried out a step of connecting the new car device 202A and the old car controller 201 to each other in a wired manner.

As described above, the series of divided construction work steps includes the second divided construction work step S2 including at least the following steps B1 to B2.

(Step B1) The step of installing the new car device 202A in the car.

(Step B2) The step of connecting the new car device 202A and the communication-enabled car device 700 to each other in a wired manner and connecting the new car device 202A and the old car controller 201 to each other in a wired manner.

After execution of the above-mentioned steps, the old control board 101 of the old control panel 100 can communicate with the new car device 202A via the communication relay device 500 and the communication-enabled car device 700.

As described above, the divided construction work step S2 includes the step of installing the new car device 202A in the car and connecting the new car device 202A and the communication-enabled car device 700 to each other. After termination of the divided construction work step S2, the old control panel 100 is in a state of being communicable with the new car device 202A via the communication relay device 500 and the communication-enabled car device 700.

Thus, after termination of the divided construction work step S2, the elevator can be controlled through the old control panel 100 under a state in which the old hall devices 300 and the communication-enabled hall devices 600 are present at the same time and the car device has been renovated. As a result, the elevator can be brought into a normally operable state. Specifically, the user can use the elevator by using the communication-enabled hall device 600 or the old hall device 300 at the hall of each of the floors and using the new car device 202A in the car.

(Divided Work-Execution Step S3: Work on Landing)

Figure 6:
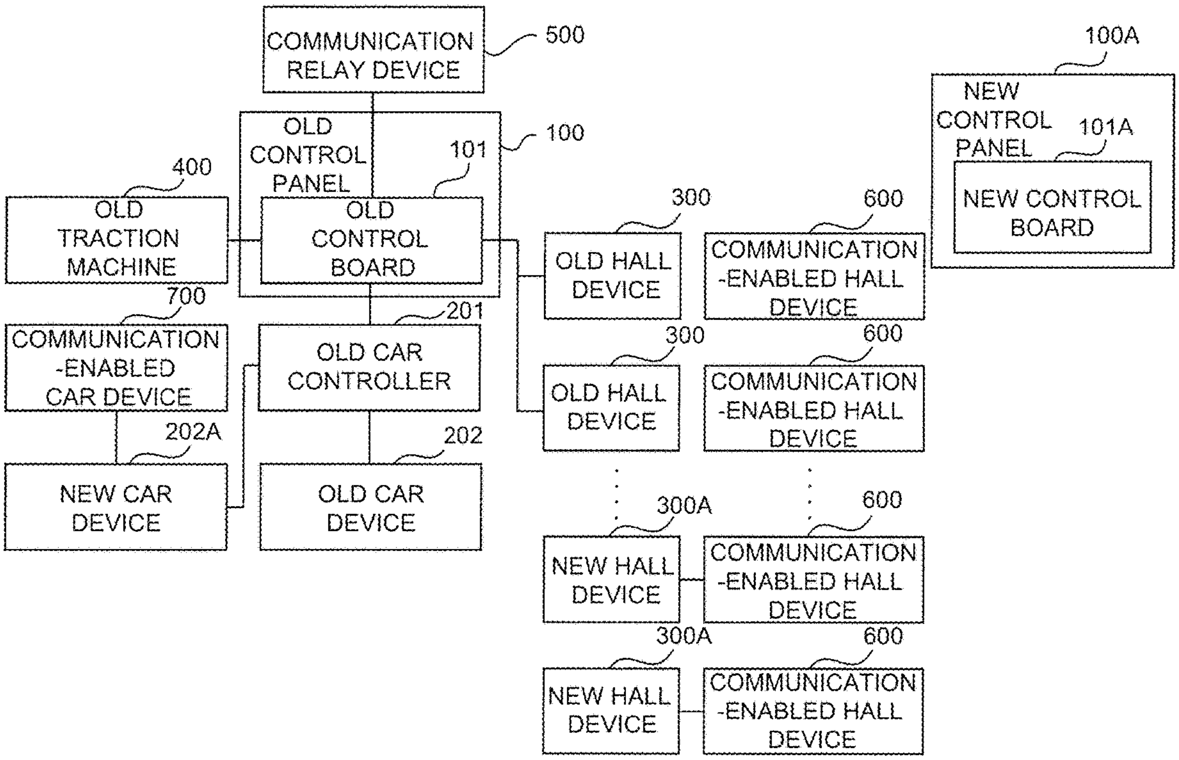
FIG. 6 is a block diagram for illustrating a state of the elevator device after a divided construction work step S3-1 is carried out for the elevator device in the state illustrated in FIG. 5.
Figure 7:
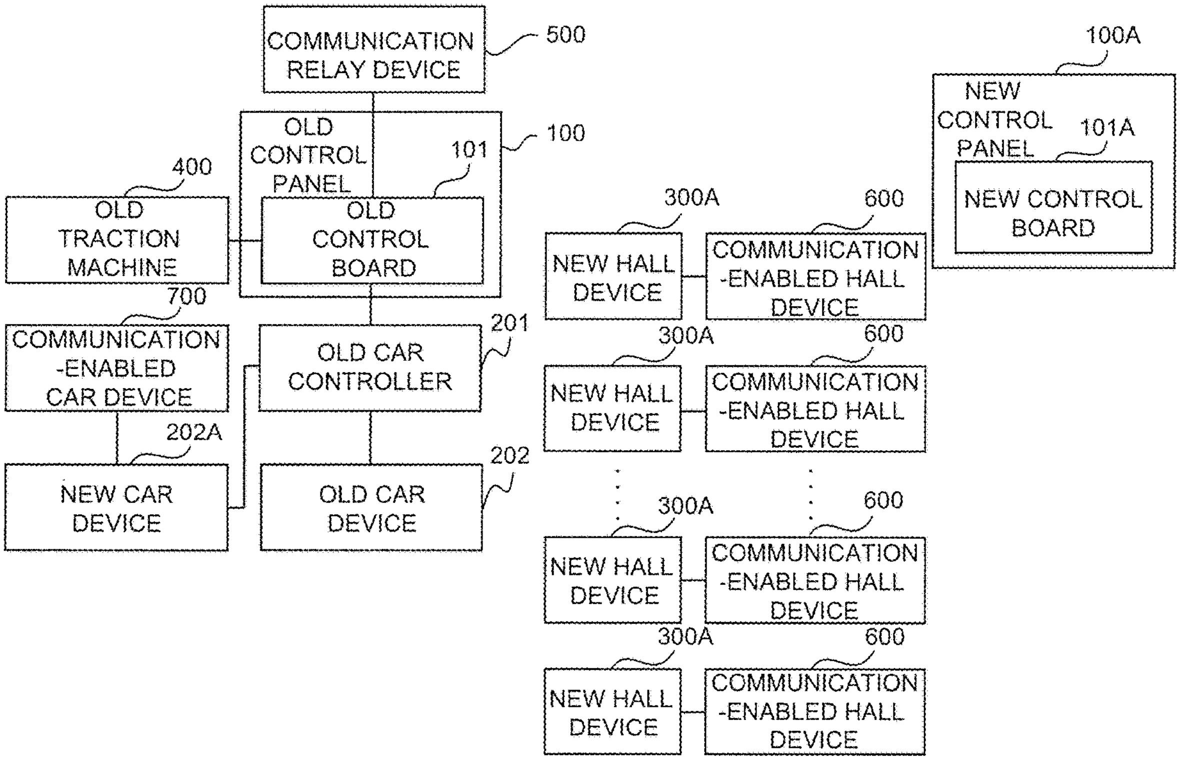
FIG. 7 is a block diagram for illustrating a state of the elevator device after a divided construction work step S3-2 is carried out for the elevator device in the state illustrated in FIG. 6.

Next, the divided construction work step S3 is described with reference to FIG. 6 and FIG. 7. FIG. 6 is a block diagram for illustrating a state of the elevator device after the divided construction work step S3-1 is carried out for the elevator device in the state illustrated in FIG. 5. FIG. 7 is a block diagram for illustrating a state of the elevator device after the divided construction work step S3-2 is carried out for the elevator device in the state illustrated in FIG. 6.

The divided construction work step S3 is further divided into the divided construction work step S3-1 and the divided construction work step S3-2.

In the divided construction work step S3-1, there is carried out a step of removing the old car device 202. Subsequently, there is carried out a step of installing new hall devices 300A at the halls of part of all the floors on which the old hall devices 300 are currently installed, respectively. Subsequently, there is carried out a step of connecting the new hall device 300A and the communication-enabled hall device 600 to each other in a wired manner on each of the floors on which the new hall devices 300A are installed, respectively. Subsequently, there is carried out a step of removing the old hall device 300 on each of the floors on which the new hall devices 300A are installed, respectively.

As described above, the divided construction work step S3-1, which is a step obtained by further dividing the divided construction work step S3 corresponding to one of the series of the divided construction work steps, includes at least the following steps C1 to C4.

(Step C1) The step of removing the old car device 202.

(Step C2) The step of installing the new hall devices 300A at the halls of part of all the floors on which the old hall devices 300 are installed, respectively.

(Step C3) The step of connecting the new hall device 300A and the communication-enabled hall device 600 to each other in a wired manner on each of the floors on which the new hall devices 300A are installed, respectively, and removing the old hall devices 300.

After execution of the above-mentioned steps, the old control board 101 of the old control panel 100 can communicate with the new hall devices 300A installed at the halls of part of all the floors via the communication relay device 500 and the communication-enabled hall devices 600. Further, the old control board 101 communicates with the old hall devices 300 installed at the halls of the other floors of all the floors, and can communicate with the communication-enabled hall devices 600 installed at the halls of the other floors via the communication relay device 500.

Thus, after termination of the divided construction work step S3-1, the elevator can be controlled through the old control panel 100 under a state in which the hall devices have been renovated at the halls of part of all the floors and the car device has been renovated. As a result, the elevator can be brought into a normally operable state. Specifically, the user can use the elevator by using the new hall devices 300A at the halls of part of all the floors, using the communication-enabled hall devices 600 or the old hall devices 300 at the halls of the other floors of all the floors, and using the new car device 202A in the car.

In the divided construction work step S3-2 after execution of the divided construction work step S3-1, there is carried out a step of installing the new hall devices 300A at the halls of the other floors of all the floors. Subsequently, there is carried out a step of connecting the new hall device 300A and the communication-enabled hall device 600 to each other in a wired manner on each of the floors on which the new hall devices 300A are installed, respectively. Subsequently, there is carried out a step of removing the old hall device 300 on each of the floors on which the new hall devices 300A are installed, respectively.

As described above, the divided construction work step S3-2, which is a step obtained by further dividing the divided construction work step S3 corresponding to one of the series of the divided construction work steps, includes at least the following steps C4 to C5.

(Step C4) The step of installing the new hall devices 300A at the halls of the other floors of all the floors on which the old hall devices 300 are installed, respectively.

(Step C5) The step of connecting the new hall device 300A and the communication-enabled hall device 600 to each other in a wired manner on each of the floors on which the new hall devices 300A are installed, respectively, and removing the old hall devices 300.

After execution of the above-mentioned steps, the old control board 101 of the old control panel 100 can communicate with the new hall devices 300A installed at the halls of all the floors via the communication relay device 500 and the communication-enabled hall devices 600.

Thus, after termination of the divided construction work step S3-2, the elevator can be controlled through the old control panel 100 under a state in which the hall devices have been renovated at the halls of all the floors and the car device has been renovated. As a result, the elevator can be brought into a normally operable state. Specifically, the user can use the elevator by using the new hall device 300A at the hall of each of the floors and using the new car device 202A in the car.

As described above, the construction work step S3 includes the step of installing the new hall device 300A at the hall and connecting the hall device 300A and the communication-enabled hall device 600 to each other. After termination of the divided construction work step S3, the old control panel 100 is in a state of being communicable with the new hall device 300A via the communication relay device 500 and the communication-enabled hall device 600.

(Divided Work-Execution Step S4: Control Modernization Work)

Figure 8:
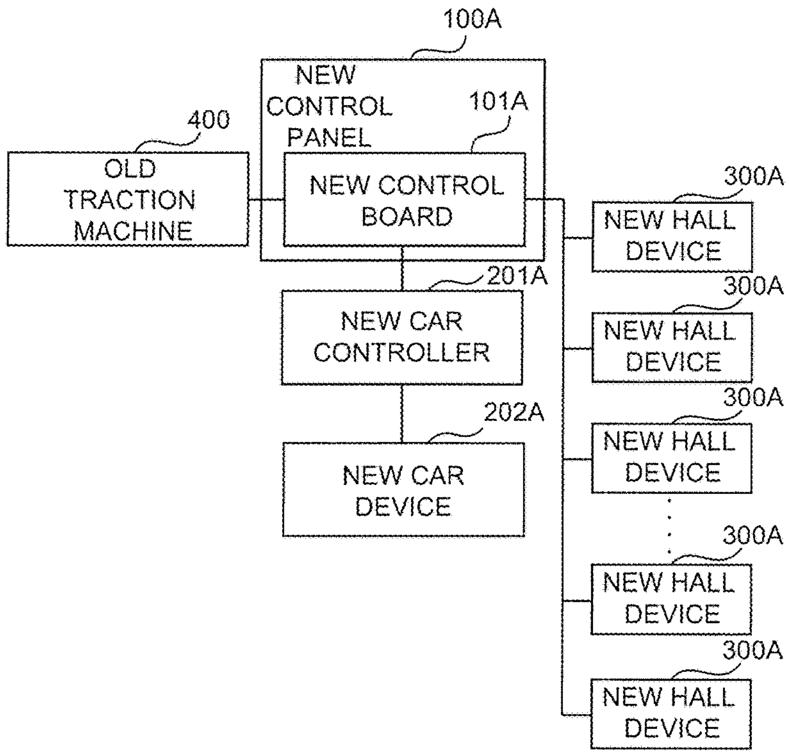
FIG. 8 is a block diagram for illustrating a state of the elevator device after a divided construction work step S4 is carried out for the elevator device in the state illustrated in FIG. 7.

Next, the divided construction work step S4 is described with reference to FIG. 8. FIG. 8 is a block diagram for illustrating a state of the elevator device after the divided construction work step S4 is carried out for the elevator device in the state illustrated in FIG. 7.

In the divided construction work step S4, there is carried out a step of installing a new car controller 201A in the car and connecting the new car controller 201A and the new control board 101A of the new control panel 100A to each other in a wired manner. Subsequently, there is carried out a step of removing the old car controller 201 and the communication-enabled car device 700.

There is carried out a step of connecting the new hall device 300A installed at the hall of each of the floors and the new control board 101A of the new control panel 100A to each other in a wired manner. Subsequently, there is carried out a step of removing the old hall devices 300 and the communication-enabled hall devices 600.

Subsequently, there is carried out a step of connecting the old traction machine 400 and the new control board 101A of the new control panel 100A to each other in a wired manner.

As described above, the fourth divided construction work step S4, which is one of the series of divided construction work steps, includes at least the following steps D1 to D4.

(Step D1) The step of installing the new car controller 201A in the car and connecting the new car controller 201A and the new control board 101A of the new control panel 100A to each other in a wired manner.

(Step D2) The step of removing the old car controller 201, the communication-enabled hall devices 600, and the communication-enabled car device 700.

(Step D3) The step of connecting each of the new hall devices 300A installed at the halls of the floors and the new control board 101A of the new control panel 100A to each other in a wired manner.

(Step D4) The step of connecting the old traction machine 400 and the new control board 101A of the new control panel 100A to each other in a wired manner.

After execution of the above-mentioned steps, the new control board 101A of the new control panel 100A can communicate with the new car device 202A via the new car controller 201A. Further, the new control board 101A can also communicate with each of the new hall devices 300A and the old traction machine 400.

As described above, the divided construction work step S4 includes the steps of: installing the new car controller 201A in the car and connecting the new car controller 201A and the new control panel 100A to each other; and connecting each of the new hall devices 300A and the new control panel 100A to each other. Further, after termination of the divided construction work step S4, the new control panel 100A is in a state of being communicable with the new car device 202A via the new car controller 201A and is in a state of being communicable with the new hall devices 300A.

Thus, after termination of the divided construction work step S4, the elevator can be controlled through the new control panel 100A under a state in which the control panel and the controller have been renovated. As a result, the elevator can be brought into a normally operable state. Specifically, the user can use the elevator by using the new hall device 300A and using the new car device 202A in the car.

(Divided Work-Execution Step S5: Hoisting Machine Replacement Work)

Figure 9:
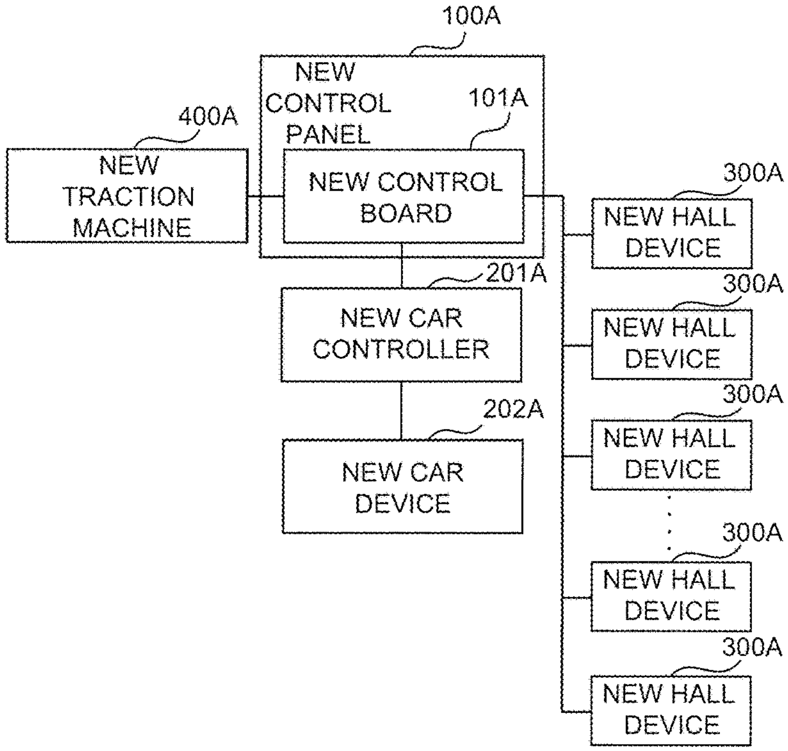
FIG. 9 is a block diagram for illustrating a state of the elevator device after a divided construction work step S5 is carried out for the elevator device in the state illustrated in FIG. 8.

Next, the divided construction work step S5 is described with reference to FIG. 9. FIG. 9 is a block diagram for illustrating a state of the elevator device after the divided construction work step S5 is carried out for the elevator device in the state illustrated in FIG. 8.

In the divided construction work step S5, there is carried out a step of replacing the old traction machine 400 with a new traction machine 400A. Subsequently, there is carried out a step of connecting the new control board 101A of the new control panel 100A and the new traction machine 400A to each other in a wired manner.

As described above, the fifth divided construction work step S5, which is one of the series of divided construction work steps, includes at least the following steps E1 and E2.

(Step E1) The step of replacing the old traction machine 400 with the new traction machine 400A.

(Step E2) The step of connecting the new control panel 100A and the new traction machine 400A to each other in a wired manner.

After execution of the above-mentioned steps, the new control board 101A of the new control panel 100A can communicate with the new traction machine 400A.

As described above, the divided construction work step S5 includes the steps of: replacing the old traction machine 400 with the new traction machine 400A; and connecting the new traction machine 400A and the new control panel 100A to each other. Further, after termination of the divided construction work step S5, the new control panel 100A is in a state of being communicable with the new traction machine 400A.

Thus, after termination of the divided construction work step S5, the elevator can be controlled through the new control panel 100A under a state in which the traction machine has been renovated. As a result, the elevator can be brought into a normally operable state.

When all the above-mentioned series of divided construction work steps S1 to S5 is completed, the renewal of the elevator is completed. As described above, at the time of completion of the renewal of the elevator, all the devices to be renovated are connected to the new control panel 100A. Thus, the old control panel 100 is not needed. Thus, the old control panel 100, which is no longer needed, can be removed. The old control panel 100 may be removed at timing of, for example, completion of the renewal or maintenance of the elevator.

All the divided construction work steps S2 to S5 are not required to be carried out, and execution of part of the steps may be skipped.

As mentioned above, according to the first embodiment of the present invention, in the elevator renewal construction method, the divided construction work step S1, which is one of the series of the divided construction work steps, includes the steps of: installing the communication-enabled hall device 600 at each hall; installing the communication-enabled car device 700 in a car; and installing the communication relay device 500 and connecting the communication relay device 500 and the old control panel 100 to each other; connecting the communication relay device 500 and each of the communication-enabled hall devices 600 to each other and connecting the communication relay device 500 and the communication-enabled car device 700 to each other. Further, after termination of the divided construction work step S1, the old control panel 100 is in a state of being communicable with the communication-enabled hall devices 600 and the communication-enabled car device 700 via the communication relay device 500.

In this manner, shortening of the continuous elevator out-of-service period during the elevator renewal construction work period can be achieved. At the same time, both of device cost and work cost can be reduced.

REFERENCE SIGNS LIST

1 machine room, 2 traction machine, 3 control panel, 4 speed governor, 5 hoistway, 6 car, 7 counterweight, 8 main rope, 9 guide rail, 10 terminal slowdown switch, 11 door driving device, 12 car operating panel, 13 hall, 14 hall operating panel, 15 pit, 16 buffer, 17 traveling cable, 18 car controller, 100 old control panel, 101 old control board, 100A new control panel, 101A new control board, 201 old car controller, 202 old car device, 201A new car controller, 202A new car device, 300 old hall device, 300A new hall device, 400 old traction machine, 400A new traction machine, 500 communication relay device, 600 communication-enabled hall device, 700 communication-enabled car device

The invention claimed is:

1. An elevator renewal construction method, comprising:

dividing, at a time of renewal of at least one device in an elevator, a process of the renewal into a series of divided construction work steps each determined as such a unit that the elevator is brought into a normally operable state in which a user can use the elevator after termination of each of the divided construction work steps; and executing the renewal in accordance with the series of divided construction work steps, wherein the elevator includes an existing hall device at each hall prior to the renewal, wherein the elevator includes an existing car device in a car prior to the renewal, wherein the elevator includes an existing control panel prior to the renewal, wherein the series of the divided construction work steps includes a first divided construction work step, the first divided construction work step including the steps of:

installing a communication-enabled hall device at said each hall;

installing a communication-enabled car device in the car;

installing a communication relay device;

connecting the communication relay device and the existing control panel to each other;

connecting the communication relay device to each of the communication-enabled hall devices; and connecting the communication relay device and the communication-enabled car device to each other, and wherein, after termination of the first divided construction work step, the existing control panel is in a state of being communicable with the communication-enabled hall devices and the communication-enabled car device via the communication relay device and is in a state of being communicable with the existing hall devices and the existing car device.

2. The elevator renewal construction method according to claim 1, wherein the series of the divided construction work steps includes a second divided construction work step, the second divided construction work step including the steps of:

installing a new car device in the car; and connecting the new car device and the communication-enabled car device to each other, and wherein, after termination of the second divided construction work step, the existing control panel is in a state of being communicable with the new car device via the communication relay device and the communication-enabled car device.

3. The elevator renewal construction method according to claim 2, wherein the series of the divided construction work steps includes a third divided construction work step, the third divided construction work step including the steps of:

installing a new hall device at at least one of said each hall; and connecting the at least one new hall device and a respective one of the communication-enabled hall devices to each other, and wherein, after termination of the third divided construction work step, the existing control panel is in a state of being communicable with the at least one new hall device via the communication relay device and the respective one of the communication-enabled hall devices.

4. The elevator renewal construction method according to claim 3, wherein the series of the divided construction work steps includes a fourth divided construction work step, the fourth divided construction work step including the steps of:

installing a new car controller in the car;

connecting the new car controller and a new control panel to each other; and connecting each of the new hall devices to the new control panel, and wherein, after termination of the fourth divided construction work step, the new control panel is in a state of being communicable with the new car device via the new car controller and is in a state of being communicable with the new hall devices.

5. The elevator renewal construction method according to claim 4, wherein the elevator includes an existing traction machine prior to the renewal, and wherein the series of the divided construction work steps includes a fifth divided construction work step, the fifth divided construction work step including the steps of:

replacing the existing traction machine with a new traction machine; and connecting the new traction machine and the new control panel to each other, and wherein, after termination of the fifth divided construction work step, the new control panel is in a state of being communicable with the new traction machine.

6. The elevator renewal construction method according to claim 5, wherein the first divided construction work step is performed first, wherein the second divided construction work step is performed after termination of the first divided construction work step, wherein the third divided construction work step is performed after termination of the second divided construction work step, wherein the fourth divided construction work step is performed after termination of the third divided construction work step, and wherein the fifth divided construction work step is performed after termination of the fourth divided construction work step.

7. The elevator renewal construction method according to claim 2, wherein the second divided construction work step is performed after termination of the first divided construction work step.

8. The elevator renewal construction method according to claim 3, wherein the first divided construction work step is performed first, wherein the second divided construction work step is performed after termination of the first divided construction work step, and wherein the third divided construction work step is performed after termination of the second divided construction work step.

9. The elevator renewal construction method according to claim 5, wherein the method further includes removing the existing control panel.

10. The elevator renewal construction method according to claim 9, removing the existing control panel is performed after the termination of the fifth divided construction work step.

11. The elevator renewal construction method according to claim 4, wherein the first divided construction work step is performed first, wherein the second divided construction work step is performed after termination of the first divided construction work step, wherein the third divided construction work step is performed after termination of the second divided construction work step, and wherein the fourth divided construction work step is performed after termination of the third divided construction work step.

12. The elevator renewal construction method according to claim 4, wherein the elevator includes an existing car controller prior to the renewal, and wherein the fourth divided construction work step further includes the steps of:

removing the existing car controller;

removing the communication-enabled car device; and removing the communication-enabled hall devices.

13. The elevator renewal construction method according to claim 12, wherein removing the existing car controller is performed after connecting said each of the new hall devices to the new control panel.

14. The elevator renewal construction method according to claim 3, wherein the third divided construction work step further includes the step of:

removing the existing car device; and removing at least one of the existing hall devices.

15. The elevator renewal construction method according to claim 14, wherein the third divided construction work step further includes the steps of:

installing a new hall device at remaining ones of said each hall where the at least one new hall device was not installed;

connecting the new hall device at the remaining ones of said each hall to the respective one of the communication-enabled hall devices, and removing the existing hall devices at the remaining ones of said each hall.

16. The elevator renewal construction method according to claim 15, wherein removing the existing car device is performed prior to installing the new hall device at the at least one of said each hall, and installing the new hall device at the remaining ones of said each hall where the at least one new hall device was not installed is performed after connecting the at least one new hall device and the respective one of the communication-enabled hall devices to each other.

17. The elevator renewal construction method according to claim 14, wherein removing the existing car device is performed prior to installing the new hall device at the at least one of said each hall.

* * * * *